US011709845B2

United States Patent
Solheim et al.

(10) Patent No.: US 11,709,845 B2
(45) Date of Patent: Jul. 25, 2023

(54) FEDERATION OF DATA DURING QUERY TIME IN COMPUTING SYSTEMS

(71) Applicant: Microsoft Technology Licensing, LLC, Redmond, WA (US)

(72) Inventors: Helge Grenager Solheim, Oslo (NO); Åge Andre Kvalnes, Fetsund (NO); Runar Bergheim Olsen, Oslo (NO); Christian Thuv, Tønsberg (NO); Jan-Ove Almli Karlberg, Tromsø (NO); Tor Kreutzer, Tromsø (NO); Kai-Marius Sæther Pedersen, Tromsø (NO); Bjørn Erik Olsrød, Stabekk (NO); Bård Kvalheim, Oslo (NO); Jeffrey Lawrence Wight, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 17/553,164

(22) Filed: Dec. 16, 2021

(65) Prior Publication Data

US 2023/0161776 A1    May 25, 2023

Related U.S. Application Data

(60) Provisional application No. 63/281,795, filed on Nov. 22, 2021.

(51) Int. Cl.
*G06F 16/2457* (2019.01)
*G06F 16/25* (2019.01)
*G06F 16/23* (2019.01)

(52) U.S. Cl.
CPC .... *G06F 16/24575* (2019.01); *G06F 16/2358* (2019.01); *G06F 16/256* (2019.01)

(58) Field of Classification Search
CPC ............ G06F 16/24575; G06F 16/256; G06F 16/2358
See application file for complete search history.

(56) References Cited

U.S. PATENT DOCUMENTS 10,516,732 B2    12/2019  Olster et al.
10,768,920 B2 *   9/2020  Fontoura .................. G06F 8/65
(Continued)

OTHER PUBLICATIONS

Beiter, et al., "Globally Distributed Cloud Services: Design Patterns and Operational Best Practices", In Journal of Research Disclosure, Feb. 7, 2017, 38 Pages.

(Continued)

*Primary Examiner* — Tamara T Kyle
*Assistant Examiner* — Michal Bogacki
(74) *Attorney, Agent, or Firm* — Chin IP, PLLC (57) ABSTRACT

Techniques of federation of data during query time are disclosed herein. One example technique includes upon receiving an indication of interaction of a file by a user of a tenant, determining whether automatic replication of the file to a user shard corresponding to the user is permitted according to a company policy or a legal requirement, the user shard being in a second geographic region. The example technique can then include when automatic replication of the file is not permitted, storing the file in a tenant shard corresponding to the tenant in a network storage in the first geographic region and instead of replicating the file to the user shard in the second geographic region, creating, in the user shard in the second geographic region, a file reference that is a pointer to the file stored in the tenant shard in the network storage in the first geographic region.

20 Claims, 7 Drawing Sheets

(56) References Cited

U.S. PATENT DOCUMENTS

| | | | | |
|---|---|---|---|---|
| 11,269,939 | B1* | 3/2022 | Sammer | H04L 67/55 |
| 11,392,578 | B1* | 7/2022 | James | G06F 16/24573 |
| 2016/0335338 | A1 | 11/2016 | Beiter | |
| 2018/0203869 | A1* | 7/2018 | Henriques | G06F 16/951 |
| 2019/0356669 | A1* | 11/2019 | Karlberg | H04L 65/1059 |
| 2020/0380000 | A1* | 12/2020 | Busjaeger | G06F 16/24568 |
| 2021/0067589 | A1 | 3/2021 | Kreutzer et al. | |

OTHER PUBLICATIONS

"International Search Report and Written Opinion Issued in PCT Application No. PCT/US22/041770", dated Dec. 13, 2022, 10 Pages.

\* cited by examiner

FEDERATION OF DATA DURING QUERY TIME IN COMPUTING SYSTEMS

CROSS-REFERENCE TO RELATED APPLICATION(S)

This application is a non-provisional of and claims priority to U.S. Provisional Application No. 63/281,795, filed on Nov. 22, 2021.

BACKGROUND

Distributed computing systems typically include routers, switches, bridges, and other types of network devices that interconnect large numbers of servers, network storage devices, or other computing devices. The individual servers can host one or more virtual machines ("VMs"), containers, virtual switches, or other virtualized functions. The virtual machines or containers can facilitate execution of suitable applications for individual users to provide to the users desired cloud services or other suitable computing services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Datacenters or other large-scale distributed computing systems can provide computing resources such as processing power and data storage as computing services accessible to tenants via a computer network. To facilitate ready access, data relevant to a user, group, or site of a tenant such as an organization can be stored in a dedicated network location referred to as a shard. The shard can be a physical and/or logical storage location that contains emails, chats, instant messages, documents, or other types of data with which the user, group, or site has interacted. During operation, copies of a file relevant to multiple users, groups, or sites can be replicated to respective shards such that each shard can contain a copy of the same file for ready access. For example, copies of a document initially created by a first user and subsequently modified by a second user can be replicated to the shards of both the first and second users. Thus, both the first and second users can readily query for and access the modified document in respective shards.

Though dedicated shards for individual users can facilitate fast and efficient query of and access to stored data, data replication to the shards may not always be possible. When a user is a part of a tenant across multiple geographic regions, company policies and/or legal requirements may prevent some or all user data to be copied from one geographic region to another. For example, the European Union does not permit automatic copying of user data from Europe to Asia. Instead, user data can only be copied from Europe to Asia in response to a user request, such as during query time. This restriction can negatively impact accuracy of query results when some data relevant to a user may be absent in the shard of the user. For instance, a user resides in Asia and has created or modified files in Europe may not have ready access to the created or modified files in Europe because of the restriction of proactively copying of the files from Europe to the user's shard in Asia.

Several embodiments of the disclosed technology can address certain aspects of the foregoing drawback by implementing (1) a tenant-wide shard that is configured to store data that cannot be proactively copied from one geographic region to another; and (2) a file reference in a shard of a user in one geographic region for locating a copy of a file stored in the tenant-wide shard in another geographic region during query time. In certain implementations, a file management system can be configured to provide a file tracker configured to detect that a file has been created, modified, viewed, commented on, or otherwise interacted with in a geographic region. In response to detecting a user interaction with a file, the file tracker can register the file as revised in, for instance, a file database. In other implementations, the file tracker can provide notification of the detected file interaction to other components of the file management system automatically or in other suitable manners.

The file management system can also provide a file processor that is configured to monitor for any revised files registered in the file database. Upon detecting that a revised file is registered in the file database by the file tracker, the file processor can be configured to (1) identify a physical location of the file; and (2) determine whether the file is to be replicated to other physical location(s). For instance, in the example above, upon detecting that the user residing in Asia has modified a file residing in Europe, the file processor can be configured to determine that a copy of the modified file may be replicated to the user's shard in Asia.

Upon determining that replication of the file may be performed, the file processor can be configured to determine whether such replication is permitted under company policies and/or legal requirements based on the identified physical location of the file and the physical location of a replication destination such as the user's shard. Upon determining that replication of the file is permitted, for instance, the file and the user's shard are co-located in a single geographic region, a copy of the file can be replicated to the user's shard. On the other hand, as in the example above in which the file is modified in Europe while the user's shard is in Asia, the file processor can determine that replication is not permitted under European Union regulations or other suitable requirements.

In response, the file processor can be configured to (1) store the modified file in a tenant-wide shard in Europe; and (2) creating a file reference to the stored file in the shard of the user in Asia. The tenant-wide shard can be configured to contain data that the file processor has determined that replication to other geographic regions is not permitted. In certain embodiments, a tenant (e.g., a corporation) can have a single tenant-wide shard in a geographic region for multiple users of the tenant. In other embodiments, a single tenant-wide shard can be configured to contain data from multiple geographic regions that may not be replicated to additional geographic regions. For instance, a single tenant-wide shard may be configured to contain data from both North America and South America. In further embodiments, the tenant can have multiple tenant-wide shards located in a single geographic region.

In certain embodiments, the created file reference can include a file identification string/number, a Universal Resource Locator (URL) of the stored file in the tenant-wide shard, or other suitable types of identifiers or pointers to the corresponding file stored in the tenant-wide shard in another geographic region. In other embodiments, the file reference can also include metadata, such as a file name, a date/time of creation/modification, created by, last modified by, or other suitable information permitted under applicable regulations. The file processor can also be configured to attach metadata to the file stored at the tenant-wide shard to indicate that a file reference to the file has been created in the user's shard in another geographic region, such as Asia.

The file reference created in the user shard and the file stored in the tenant-wide shard can facilitate ready query and access of the file by the user across different geographic regions. For example, a user can submit a query to a search engine of the file management system for any files recently modified by the user. In response, the search engine can be configured to search all files and file references in the user's shard. Upon identifying a file reference during the search, the search engine can be configured to use the file reference to retrieve a copy of or "hydrate" the corresponding file in an ad hoc basis. For instance, in the example above, upon identifying the file reference, the search engine can submit a query to the tenant-wide shard in Europe with the file reference. In response, the tenant-wide shard can provide a copy of the corresponding file to the search engine to be output to the user. As such, the file reference stored in the user's shard in Asia and the file stored in the tenant-wide shard in Europe are combined or "federated" during query time to provide ready access of the file to the user. Subsequently, information in the file reference can be combined with the received file and the file reference can be deleted from the user shard.

Several embodiments of the disclosed technology can thus provide efficient query and access to files stored across geographic regions while complying with applicable company policies and/or legal regulations in one or more of the geographic regions. Instead of replicating all files interacted with by a user into the user's shard in a geographic region, file references of certain files can be used as placeholders for non-replicable files. To facilitate ready hydration of such non-replicable files during query time, the tenant-wide shard can be configured as a single point of access. As such, fan-out operations to locate non-replicable files during query time can be avoided to reduce latency of hydrating such non-replicable files.

DETAILED DESCRIPTION

Certain embodiments of systems, devices, components, modules, routines, data structures, and processes for federating data during query time in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-4.

As described herein, a distributed computing system can include an interconnected computer network having a plurality of network devices that interconnect a plurality of servers or hosts to one another or to external networks (e.g., the Internet). At least some of the servers or hosts can be in, for example, different datacenters at diverse geographic locations. A network device can include a physical or virtual network device, examples of which include physical or virtual routers, switches, hubs, bridges, load balancers, security gateways, or firewalls. A host can include a computing device configured to implement, for instance, one or more virtual machines, containers, or other suitable virtualized components. For example, a host can include a server having a hypervisor configured to support one or more virtual machines. In another example, a host can include a virtual machine hosting one or more containers or other suitable types of virtual components.

Computer system resource or computing resource can include any physical or virtual component of limited availability within a distributed computing system. Example computing resource can include processor capacities (e.g., CPU), network capacities (e.g., network connections and network bandwidth), and computer readable storage capacities (e.g., memory blocks in solid state devices). Executing an application in a computer system can consume various amount of computing assets. For example, executing an application for voice-over-IP conference can consume an amount of computing and network assets. In another example, executing an application of database management can consume an amount of processor capacities and storage capacities.

A computing service can provide computing resources to users over a computer network such as the Internet. Common examples of computing services include software as a service (SaaS), platform as a service (PaaS), and infrastructure as a service (IaaS). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Figure 1:
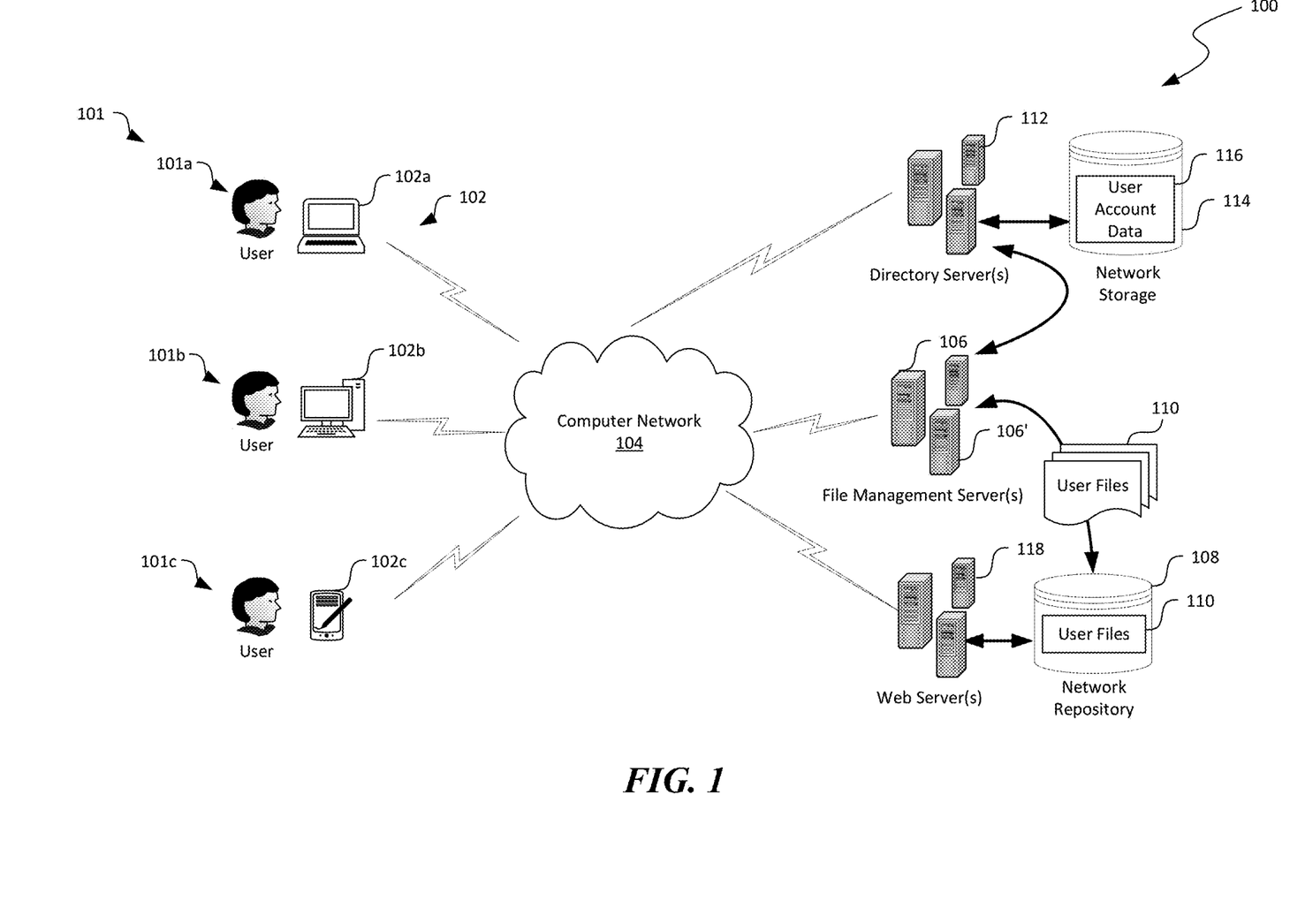
FIG. 1 is a schematic diagram illustrating a distributed computing system implementing federation of data during query time in accordance with embodiments of the disclosed technology.

FIG. 1 is a schematic diagram illustrating a distributed computing system 100 implementing federation of data during query time in accordance with embodiments of the disclosed technology. As shown in FIG. 1, the distributed computing system 100 can include a computer network 104 interconnecting client devices 102 corresponding to users 101, a file management server 106, a directory server 112, and one or more web servers 118. The computer network 104 can include an enterprise intranet, a wide area network, the Internet, or other suitable types of networks.

In certain embodiments, the file management server 106, the directory server 112, and the web servers 118 can each include one or more interconnected computer servers, as shown in FIG. 1. In other embodiments, the foregoing components of the distributed computing system 100 can each include a cloud-based service hosted on one or more remote computing facilities such as datacenters. In further embodiments, certain components (e.g., the web servers 118) may be omitted from the distributed computing system 100 in FIG. 1, and the corresponding functions can be provided by external computing systems (not shown).

The distributed computing system 100 can also include a network repository 108 operatively coupled to the web servers 118 and a network storage 114 operatively coupled to the directory server 112. As shown in FIG. 1, the network repository 108 can be configured to store records of user files 110 accessible to the users 101 via the client devices 102 and the computer network 104. The user files 110 can include any suitable application data created, used, interacted with, or otherwise accessible to the users 110. For example, examples of the user files 110 can include documents, images, videos, or other suitable types of digital objects.

The network storage 114 can be configured to store records of user account data 116. Example user account data 116 include usernames, user locations, user alias, user pictures, user contact information, access control credentials, and/or other suitable types of user information. In accordance with embodiments of the disclosed technology, the user account data 116 can also include data representing a geographic location in which a dedicated storage location or "shard" (shown in FIGS. 2A-2D) corresponding to each of the users 101 is located. The geographic location can identity a geographic region (e.g., the European Union), a country (e.g., Ireland), a state/province (e.g., Connacht), a county (e.g., Roscommon), a city (e.g., Dublin), a datacenter, one or more racks in a datacenter, or other suitable location. In certain embodiments, an administrator (not shown) can configure the geographic location for each user 101 when the user account data 116 is created and/or modified. In other embodiments, the geographic location for each user 101 can be automatically set, at least initially, to a default geographic location of the user 101. In further embodiments, the geographic location can be set, reset, or modified by the users 101 and/or the administer in other suitable manners.

Even though particular components and associated arrangements of the distributed computing system 100 are shown in FIG. 1, in other embodiments, the distributed computing system 100 can include additional and/or different components. For example, in certain embodiments, the network repository 108 and the network storage 114 can be combined into a single physical or logical storage space accessible via the computer network 104. In further embodiments, the distributed computing system 100 can also include additional servers, network storages, load balancers, or other suitable components.

The client devices 102 can individually include a computing device that facilitates access to the network repository 108 via the computer network 104 by the users 101 (identified as first, second, and third users 101a-101c, respectively). For example, in the illustrated embodiment, the first client device 102a is a laptop computer. The second client device 102b is a desktop computer. The third client device 102c is a tablet computer. In other embodiments, the client devices 102 can also include smartphones, tablets, or other suitable computing devices. Even though three users 101a-101c are shown in FIG. 1 for illustration purposes, in other embodiments, the distributed computing system 100 can facilitate any suitable number of users 101 access to the network repository 108 via the computer network 104.

The web servers 118 can be configured to provide the user files 110 to the users 101 via the computer network 104. For example, in one embodiment, the web servers 118 can be configured to provide an enterprise internal website that allows the users 101 to securely exchange information and to cooperate on performing tasks or executing a project. In other embodiments, the web servers 118 can also be configured to provide a social network website that allows the users 101 to post user files 110, comment on one another's user files 110, share and/or recommend user files 110 with additional users 101, or perform other suitable actions. In certain embodiments, the web servers 118 can also be configured to receive and store the user files 110 in the network repository 108 in cooperation with the file management server 106. In other embodiments, the distributed computing system 100 can further include a database server (not shown) or other suitable components configured to perform the foregoing functions.

The directory server 112 can be configured to maintain the user account data 116 for the users 101 and facilitate various account related operations, such as access control, data queries, etc. For example, in one embodiment, the directory server 112 can implement access control policies such that certain class, type, category, or other suitable grouping of the user files 110 can be accessible to specified users 101. In another embodiment, the directory server 112 can also be configured to share with various file management servers 106 data representing the geographic locations of the shards corresponding to the various users 101.

The file management server 106 can be configured to facilitate efficient storage, management, and retrieval of the user files 110 by using the shards corresponding to the users 101. For example, to facilitate ready access, data relevant to a user, group, or site of a tenant in an organization can be stored in a dedicated shard. The shard can be a physical and/or logical storage location that contains emails, chats, instant messages, documents, or other types of data with which the user 101, group, or site has interacted. During operation, copies of a file relevant to multiple users 101, groups, or sites can be replicated to respective shards such that each shard can contain a copy of the same file for ready access. For example, copies of a document initially created by a first user 101a and subsequently modified by a second user 101b can be replicated to the shards of both the first and second users 101a and 101b. Thus, both the first and second users 101a and 101b can readily query for and access the modified document in respective shards.

Though dedicated shards for individual users 101 can facilitate fast and efficient query and access of stored user files 110, data replication to the shards may not always be possible. When a user 101 is a part of a tenant across multiple geographic regions, company policies and/or legal requirements may prevent some or all user files 110 to be copied to from one geographic region to another. For example, the European Union does not permit automatic copying of user data from Europe to Asia. Instead, the user data can only be copied from Europe to Asia in response to a user request, such as during query time. This restriction can negatively impact accuracy of query results when some data relevant to a user 101 may be absent in the shard of the user 101. For instance, a user 101 resides in Asia and has modified files in Europe may not have ready access to the modified files because of the restriction of proactively copying of the files from Europe to the user's shard in Asia. Several embodiments of the disclosed technology can address certain aspects of the foregoing drawback by implementing (1) a tenant-wide shard that is configured to store data that cannot be proactively copied from one geographic region to another; and (2) a file reference in a shard of a user 101 in one geographic region for locating a copy of a file in the tenant-wide shard in another geographic region during query time, as described in more detail below with reference to FIGS. 2A-2D.

Figure 2A:
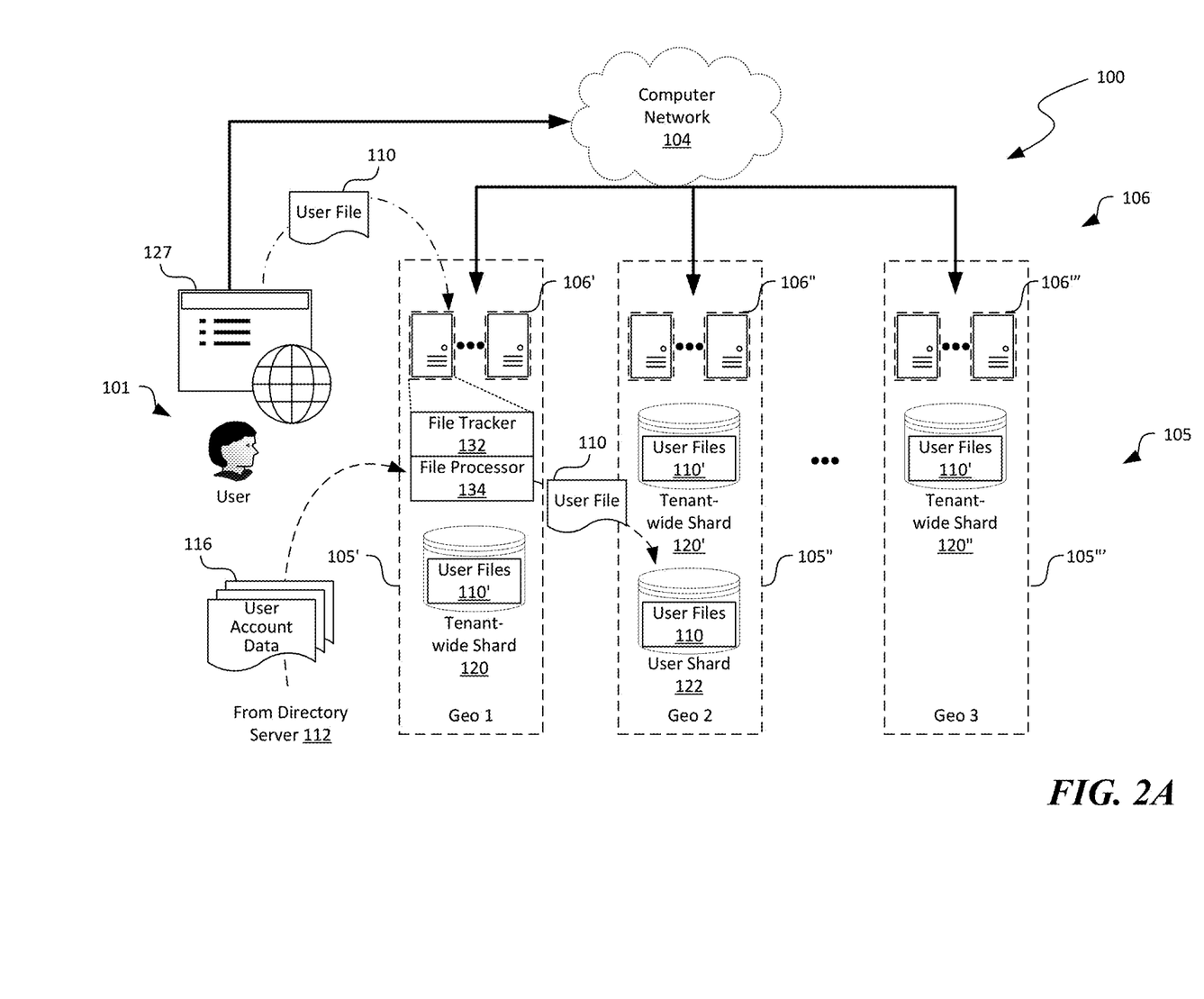
FIGS. 2A-2D are schematic diagrams illustrating example operations of the distributed computing system 100 in FIG. 1 for federating data during query time in accordance with embodiments of the disclosed technology.

As shown in FIG. 2A, a tenant can have computing resources located across multiple geographic regions 105 and interconnected with one another via the computer network 104. In the example of FIG. 2A, three geographic regions 105 shown as "Geo 1," "Geo 2," and "Geo 3" are used for illustration purposes. In other examples, the tenant may include computing resources spanning two, four, or any other suitable number of geographic regions 105. As shown in FIG. 2A, each geographic region 105 can include instances of the file management server 106, a tenant-wide shard 120 for the respective geographic region 105, and one or more user shards 122 corresponding to the users 101 of the tenant.

Though the user 101 can access all the computing resources in any of the geographic regions 105, user files 110 located in one geographic region 105 may not be permitted to be automatically replicated to a user shard 122 in another geographic region 105. For instance, as shown in FIG. 2A, a user 101 can utilize computing resources in a first geographic region 105' (e.g., "Geo 1") to create, modify, or otherwise interact with a user file 110. However, the user shard 122 corresponding to the user 101 is in a second geographic region 105" (i.e., "Geo 2"). A legal regulation in the first geographic region 105' may not permit the user file 110 to be automatically replicated from the first geographic region 105' to another geographic region 105, such as the second geographic region 105".

As shown in FIG. 2A, to address the foregoing difficulty, in certain implementations, the file management server 106' can be configured to provide a file tracker 132 configured to detect that a user file 110 has been created, modified, viewed, commented on, or otherwise interacted with in the first geographic region 105'. In response to detecting a user interaction with the user file 110, the file tracker 132 can register the user file 110 as revised in, for instance, a file database (not shown). In other implementations, the file tracker 132 can provide notification of the detected user file 110 to other components of the file management server 106' automatically or in other suitable manners.

The file management server 106' can also provide a file processor 134 that is configured to monitor for any revised user file 110 registered in the file database. Upon detecting that a revised user file 110 is registered in the database by the file tracker 132, the file processor 134 can be configured to (1) identify a physical location of the user file 110 by retrieving or otherwise receiving user account data 116 from the directory server 112; and (2) determine whether the user file 110 is to be replicated to other physical location(s). For instance, in the example in FIG. 2A, upon detecting that the user 101 residing in the second geographic region 105" (e.g., Asia) has modified the user file 110 in the first geographic region (e.g., Europe), the file processor 134 can be configured to determine that a copy of the modified user file 110 may be replicated to the user's shard 122 in Asia.

Upon determining that replication of the user file 110 may be performed, the file processor 134 can be configured to determine whether such replication is permitted under company policies and/or legal requirements based on the identified physical location of the user file 110 and a physical location of a replication destination such as the user's shard 122. Upon determining that replication of the user file 110 is permitted, a copy of the user file 110 can be replicated to the user's shard 122 in the second geographic region 105", as shown in FIG. 2A.

Figure 2B:
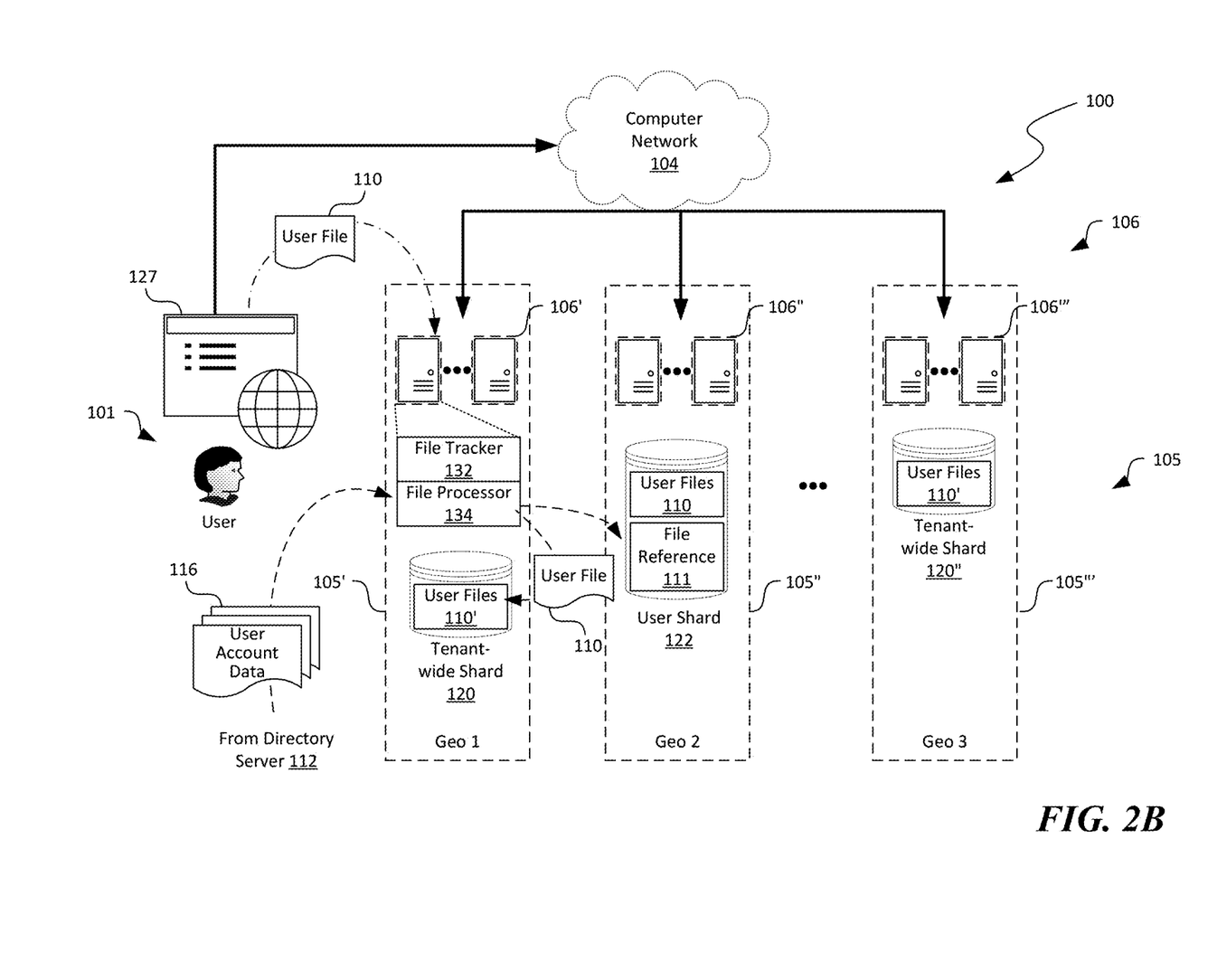

On the other hand, as shown in FIG. 2B, upon determining that replication of the user file 110 is not permitted, the file processor 134 can be configured to (1) store the modified user file 110 in a tenant-wide shard 120 in the first geographic region 105' (e.g., Europe); and (2) creating a file reference 111 to the stored user file 110 in the user shard 122 of the user located in the second geographic region 105" (e.g., Asia). The tenant-wide shard 120 can be configured to contain data that the file processor 134 has determined that replication to other geographic regions is not permitted. In certain embodiments, a tenant (e.g., a corporation) can have a single tenant-wide shard 120 in a geographic region for multiple users 101 of the tenant. In other embodiments, a single tenant-wide shard 120 can be configured to contain data from multiple geographic regions 105 that may not be replicated to additional geographic regions 105. For instance, a single tenant-wide shard 120 may be configured to contain data from both North America and South America. In further embodiments, a tenant can include multiple tenant-wide shards in a single geographic area 105.

In certain embodiments, the created file reference 111 can include a file identification string/number, a Universal Resource Locator (URL) of the stored file in the tenant-wide shard, or other suitable types of identifiers or pointers to the user file 110 stored in the tenant-wide shard 120 in another geographic region 105. In other embodiments, the file reference 111 can also include metadata, such as a file name, a date/time of creation/modification, created by, last modified by, or other suitable information permitted under applicable regulations. The file processor 134 can also be configured to attach metadata to the user file 110 stored at the tenant-wide shard 120 in the first geographic region 105' to indicate that a file reference 111 to the user file 110 has been created in the user shard 122 in the second geographic region 105", such as Asia.

Figure 2C:
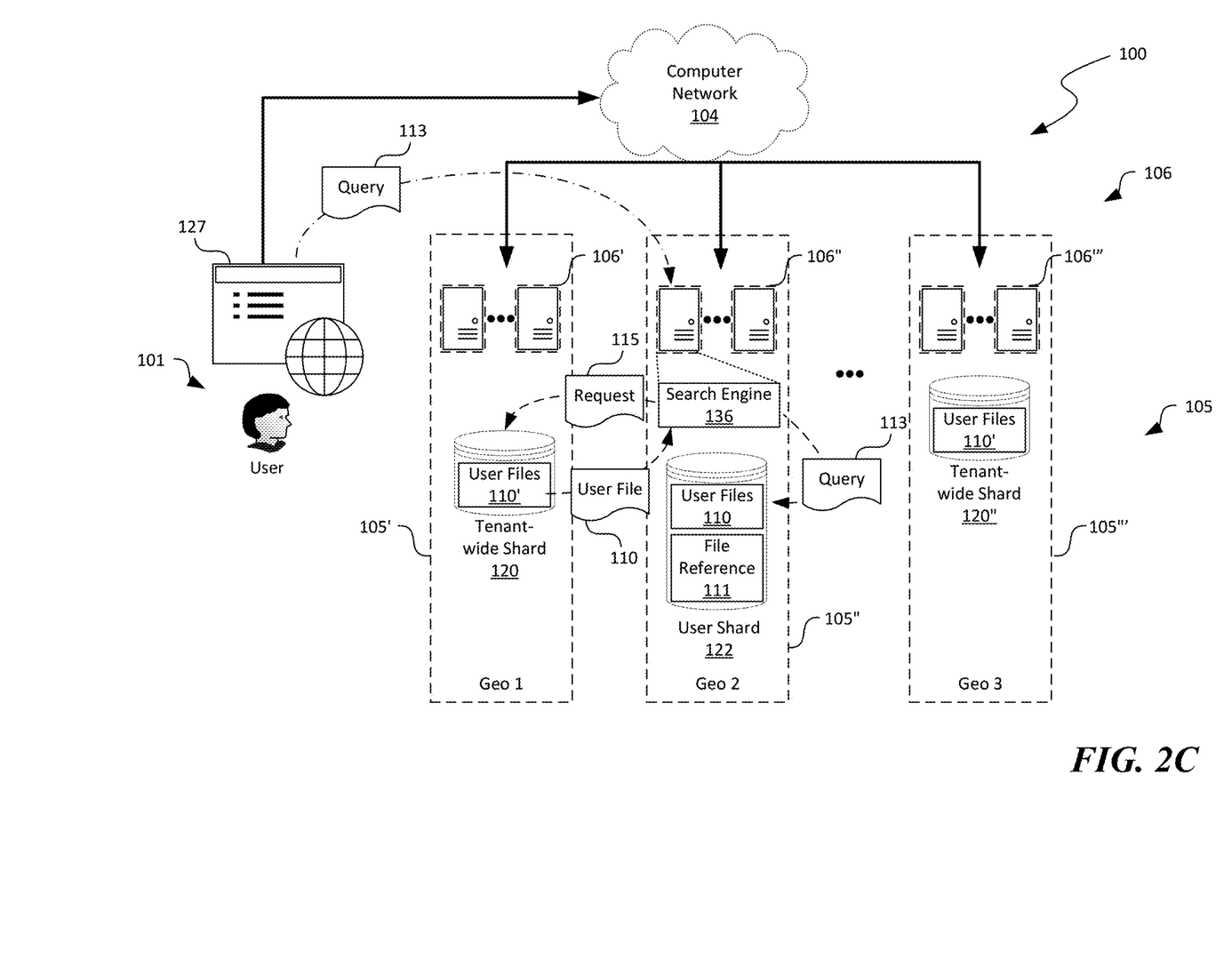
Figure 2D:
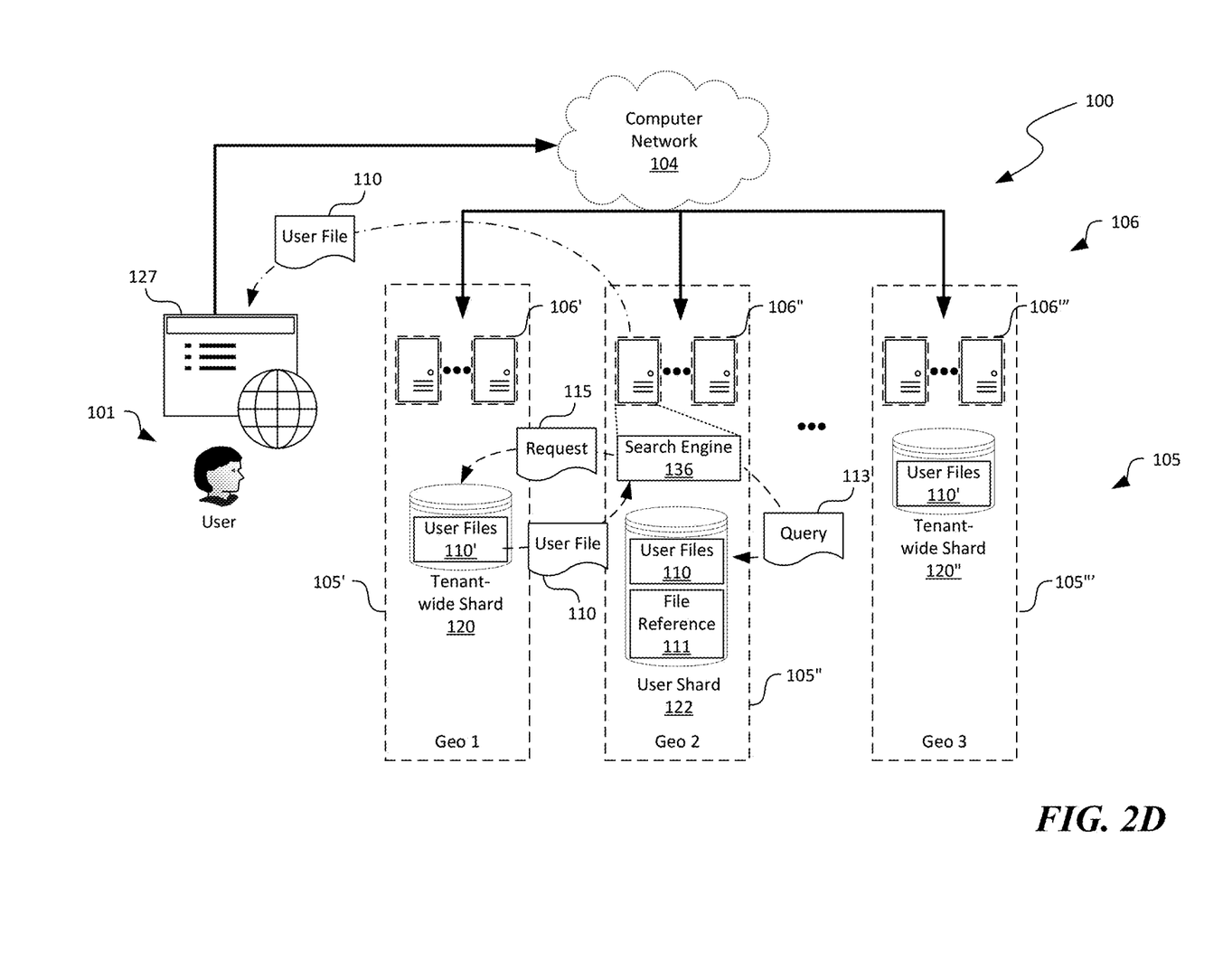

The file reference 111 created in the user shard 122 and the user file 110 stored in the tenant-wide shard 120 can facilitate ready query and access of the user file 110 by the user 101. For example, as shown in FIG. 2C, the user 101 can submit a query 113 to a search engine 136 of another instance of the file management server 106" in the second geographic region 105" for any user files 110 recently modified by the user 101. In response, the search engine 136 can be configured to search all user files 110 and file references 111 in the user shard 122 of the user 101. Upon identifying a file reference 111 during the search, the search engine 136 can be configured to use the file reference 111 to retrieve a copy of or "hydrate" the corresponding user file 110 in an ad hoc basis. For instance, in the example shown in FIG. 2C, for retrieving the user file 110 modified by the user 110 in the first geographic region 105', the search engine 136 can submit a request 115 to the tenant-wide shard 120 in the first geographic region 105' with the file reference 111. In response, the tenant-wide shard 120 in the first geographic region 105' can provide a copy of the corresponding user file 110 to the search engine 136 to be output to the user 110, as shown in FIG. 2D. As such, the file reference 111 stored in the user shard 122 in the second geographic region 105" and the user file 110 stored in the first geographic region 105' are combined or "federated" during query time to provide ready access of the user file 110 to the user 101. Subsequently, information in the file reference 111 can be combined with the received user file 110 and the file reference 111 can be deleted from the user shard 122.

Several embodiments of the disclosed technology can thus provide efficient query and access to user files 110 stored in various geographic regions 105 while complying with applicable company policies and/or legal regulations in one or more of the geographic regions 105. Instead of replicating all user files 110 interacted with by a user 101 into the user's shard 122 in a geographic region 105, file references 111 of certain files 110 can be used as placeholders for non-replicable files. To facilitate ready hydration of such non-replicable files during query time, the tenant-wide shard 120 can be configured as a single point of access. As such, fan-out operations to locate non-replicable files during query time can be avoided to reduce latency of hydrating such non-replicable files.

Figure 3A:
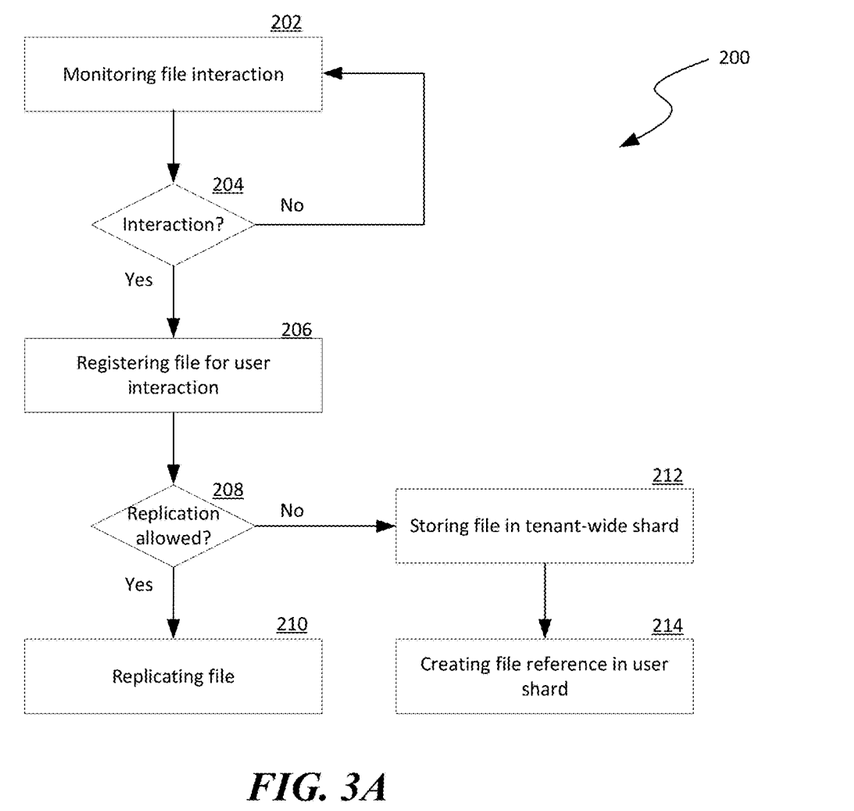
FIGS. 3A and 3B are flowcharts illustrating processes of federating of data during query time in accordance with embodiments of the disclosed technology.
Figure 3B:
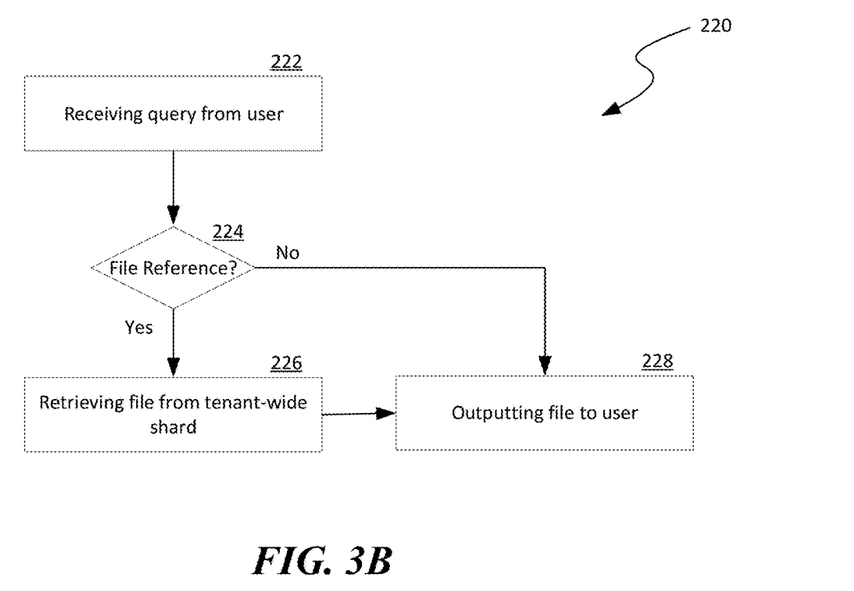

FIGS. 3A and 3B are flowcharts illustrating processes of federating of data during query time in accordance with embodiments of the disclosed technology. Though embodiments of the processes are described below in the context of the distributed computing system 100 of FIGS. 1-2D, in other embodiments, the processes may be implemented in computing systems with additional and/or different components.

As shown in FIG. 3A, a process 200 can include monitoring for file interactions at stage 202. Example file interactions can include file creation, modification, viewing, commenting, forwarding, liking, or other suitable types of interactions. The process 200 can then include a decision stage 204 to determine whether a file interaction is detected. In response to determining that no file interaction is detected, the process 200 revert to monitoring for file interaction at stage 202. Otherwise, the process 200 proceeds to registering a file for user interaction at stage 206. In certain embodiments, registering the file for user interaction can include appending metadata indicating the detected interaction to the file. In other embodiments, registering the file can also include listing the file in a database along with the detected interaction or in other suitable manners.

The process 200 can then include another decision stage 208 to determine whether replication of the file from a current location to a replication destination is allowed. For example, when the current location of the file is the same as the replication destination, the process 200 can indicate that replication is allowed. In another example, when the current location of the file is different than the replication destination, and a company policy and/or legal regulation does not permit automatic replication to the replication destination, the process 200 can indicate that replication is not allowed. Example operations of determining whether replication is allowed are described in more detail above with reference to FIGS. 2A-2D.

In response to determining that replication is allowed, the process 200 proceeds to replicating the file to the replication destination, e.g., a user shard. Otherwise, the process 200 proceeds to storing the file in a tenant-wide shard in the current location of the file at stage 212 and creating a file reference to the stored file in the replication destination, e.g., the user shard at stage 214. The file stored in the tenant-wide shard and the file reference can then be used to facilitate efficient access to the file, as described in more detail below with reference to FIG. 3B.

As shown in FIG. 3B, a process 220 of accessing a file can include receiving a query from a user for one or more files at stage 222. The process 220 can then include a decision stage 224 to determine whether a query result is a file or a file reference. In response to determining that a query result is file, the process 220 can include outputting the file to the user at stage 228. Otherwise, the process 220 includes retrieving a copy of the file using the file reference from the tenant-wide shard in another geographic region at stage 226 before outputting the file to the user at stage 228.

Figure 4:
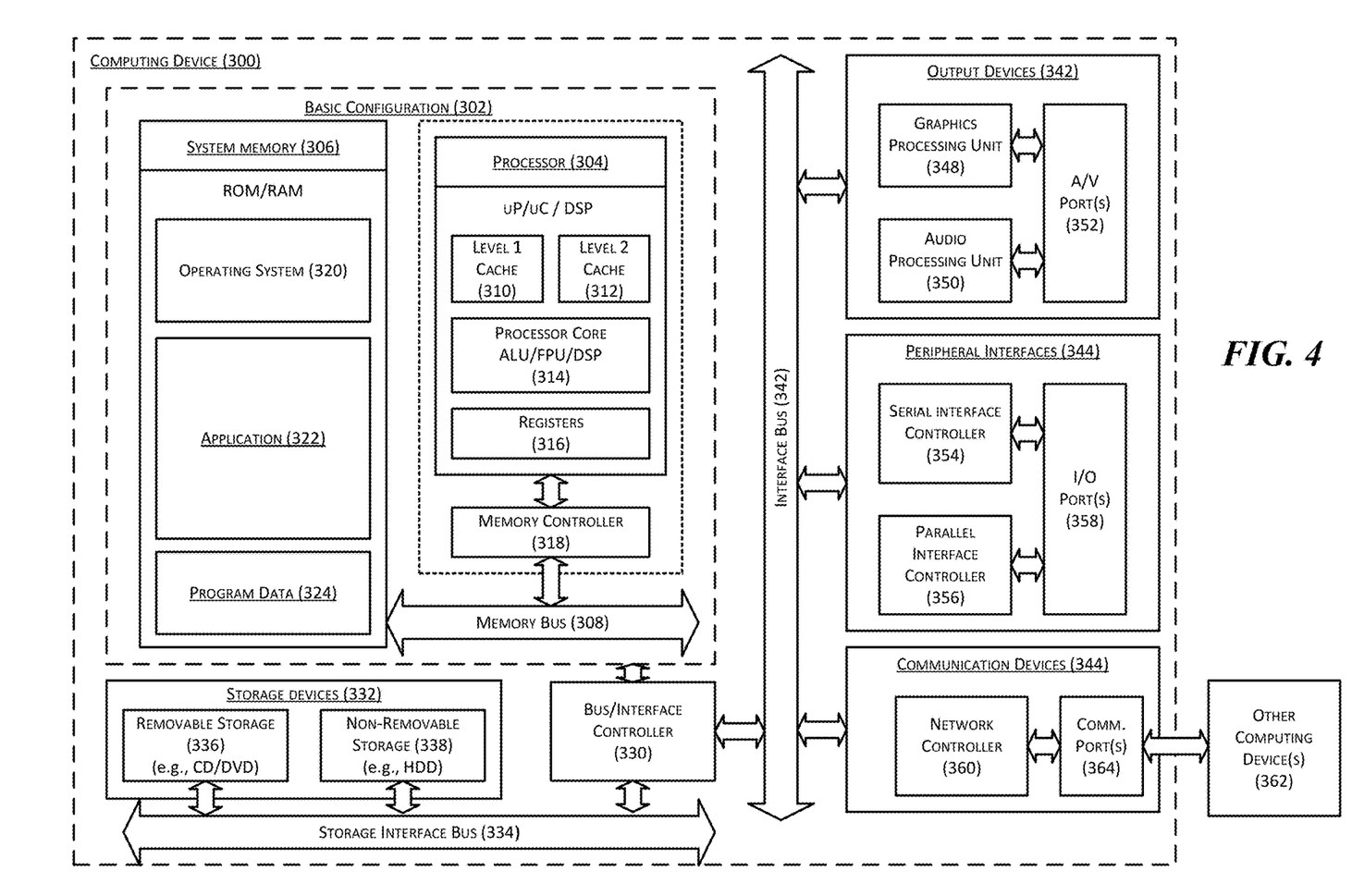
FIG. 4 is a computing device suitable for certain components of the distributed computing system in FIG. 1.

FIG. 4 is a computing device 300 suitable for certain components of the distributed computing system 100 in FIG. 1. For example, the computing device 300 can be suitable for the client devices 102, file management server 106, the directory server 112, or the web server 118 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. The operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for federating data during query time in a distributed computing system having multiple servers configured to provide the computing resources as computing services via a computer network, the method comprising:
   receiving, at a server in a first geographic region, data representing an indication of interaction of a file by a user of a tenant; and
   in response to the notification, at the server in the first geographic region,
   determining whether automatic replication of the file to a user shard corresponding to the user is permitted according to a company policy or a legal requirement, the user shard being in a second geographic region; and
   in response to determining that automatic replication of the file to the user shard in the second geographic region is not permitted,
   storing the file in a tenant shard corresponding to the tenant in a network storage in the first geographic region; and
   instead of replicating the file to the user shard in the second geographic region, creating, in the user shard in the second geographic region, a file reference that is a pointer to the file stored in the tenant shard in the network storage in the first geographic region;
   subsequently, receiving a query from the user for one or more documents; and
   in response to receiving the query from the user,
   identifying that the created file reference in the user shard as being relevant to the received query; and
   upon identifying the file reference, transmitting, to the network storage at the first geographic region, a request for a copy of the stored file corresponding to the file reference; and
   upon receiving a copy of the stored file from the network storage in the first geographic region, returning the received copy of the stored file as at least a part of a search result.

2. The method of claim 1, further comprising:
   in response to the notification, at the server in the first geographic region, creating a registration in a file database indicating that the file as being revised; and
   upon detecting the created registration, performing the determining whether automatic replication of the file to the user shard corresponding to the user is permitted according to the company policy or the legal requirement in the first geographic region.

3. The method of claim 1, further comprising:
   in response to the notification, at the server in the first geographic region, prior to determining whether automatic replication of the file to a user shard corresponding to the user is permitted,
   identifying a physical location of the file; and
   determining whether the file is to be replicated to the user shard located in another physical location; and
   in response to determining that the file is to be replicated to the user shard located in another physical location, performing the determining whether automatic replication of the file to the user shard corresponding to the user is permitted according to the company policy or the legal requirement in the first geographic region.

4. The method of claim 1, further comprising:
   in response to determining that automatic replication of the file to the user shard in the second geographic region is permitted,
   transmitting the file to another network storage in the second geographic region; and
   storing the transmitted file in the user shard at the another network storage in the second geographic region.

5. A method for federating data during query time in a distributed computing system having multiple servers configured to provide the computing resources as computing services via a computer network, the method comprising:
   receiving, at a server in a first geographic region, data representing an indication of interaction of a file by a user of a tenant; and
   in response to the notification, at the server in the first geographic region,
   determining whether automatic replication of the file to a user shard corresponding to the user is permitted according to a company policy or a legal requirement, the user shard being in a second geographic region; and in response to determining that automatic replication of the file to the user shard in the second geographic region is not permitted, storing the file in a tenant shard corresponding to the tenant in a network storage in the first geographic region; and instead of replicating the file to the user shard in the second geographic region, creating, in the user shard in the second geographic region, a file reference that is a pointer to the file stored in the tenant shard in the network storage in the first geographic region, the pointer containing data suitable to retrieve a copy of the file stored in the tenant shard in the first geographic region when the user queries for the stored file.

6. The method of claim 5 wherein:

receiving the data representing the indication of interaction of the file by the user includes receiving data representing an indication that the user has created, modified, viewed, or commented on the file; and the method further includes:

in response to the notification, at the server in the first geographic region, creating a registration in a file database indicating that the file as being revised; and upon detecting the created registration, performing the determining whether automatic replication of the file to the user shard corresponding to the user is permitted according to the company policy or the legal requirement in the first geographic region.

7. The method of claim 5, further comprising:

in response to the notification, at the server in the first geographic region, prior to determining whether automatic replication of the file to a user shard corresponding to the user is permitted, identifying a physical location of the file; and determining whether the file is to be replicated to the user shard located in another physical location; and in response to determining that the file is to be replicated to the user shard located in another physical location, performing the determining whether automatic replication of the file to the user shard corresponding to the user is permitted according to the company policy or the legal requirement in the first geographic region.

8. The method of claim 5, further comprising:

in response to determining that automatic replication of the file to the user shard in the second geographic region is permitted, transmitting the file to another network storage in the second geographic region; and storing the transmitted file in the user shard at the another network storage in the second geographic region.

9. The method of claim 5 wherein the file reference includes a file identification string, a file identification number, or a Universal Resource Locator of the file stored in the tenant shard in the first geographic location.

10. The method of claim 5, further comprising attaching metadata to the file stored at the tenant shard in the first geographic region to indicate that the file reference to the stored file has been created in the user shard in the second geographic region subsequent creating the file reference in the user shard.

11. The method of claim 5 wherein:

the user shard includes additional files and file references in addition to the created file reference; and the method further includes:

receiving, at a search engine, a query from the user for one or more documents in the user shard; and in response to receiving the query, at the search engine, determining whether any one or more of the additional files or file references match the received query.

12. The method of claim 5, further comprising:

receiving, at a search engine, a query from the user for one or more documents in the user shard; and in response to receiving the query, at the search engine, identifying the file reference as being relevant to the received query; and upon identifying the file reference, transmitting, from the search engine to the network storage at the first geographic region, a request for a copy of the stored file corresponding to the file reference; and upon receiving a copy of the stored file from the network storage in the first geographic region, returning the received copy of the stored file as at least a part of a search result.

13. The method of claim 5, further comprising:

receiving, at a search engine, a query from the user for one or more documents in the user shard; and in response to receiving the query, at the search engine, identifying the file reference as being relevant to the received query; and upon identifying the file reference, transmitting, from the search engine to the network storage at the first geographic region, a request for a copy of the stored file corresponding to the file reference; and upon receiving a copy of the stored file from the network storage in the first geographic region, returning the copy of the stored file as a part of a search result; and deleting the file reference in the user shard in the second geographic region.

14. A computing device in a distributed computing system configured to provide computing resources of the distributed computing system as computing services to users via a computer network, the computing device being in a first geographic region and comprising:

a processor; and a memory operatively coupled to the processor, the memory containing instructions executable by the processor to cause the computing device to:

upon receiving data representing an indication of interaction of a file by a user of a tenant; and determine whether automatic replication of the file to a user shard corresponding to the user is permitted according to a company policy or a legal requirement, the user shard being in a second geographic region; and in response to determining that automatic replication of the file to the user shard in the second geographic region is not permitted, store the file in a tenant shard corresponding to the tenant in a network storage in the first geographic region; and instead of replicating the file to the user shard in the second geographic region, create, in the user shard in the second geographic region, a file reference that is a pointer to the file stored in the tenant shard in the network storage in the first geographic region, the pointer containing data suitable to retrieve a copy of the file stored in the tenant shard in the first geographic region when the user queries for the stored file.

15. The computing device of claim 14 wherein the received data represents an indication that the user has created, modified, viewed, or commented on the file.

16. The computing device of claim 14 wherein the memory includes additional instructions executable by the processor to cause the computing device to:
 in response to receiving the notification, register in a file database that the file has been revised; and
 upon detecting the registered file, determine whether automatic replication of the file to the user shard corresponding to the user is permitted according to the company policy or the legal requirement in the first geographic region.

17. The computing device of claim 14 wherein the memory includes additional instructions executable by the processor to cause the computing device to:
 prior to determining whether automatic replication of the file to a user shard corresponding to the user is permitted,
 identify a physical location of the file; and
 determine whether the file is to be replicated to the user shard located in another physical location; and
 in response to determining that the file is to be replicated to the user shard located in another physical location, determine whether automatic replication of the file to the user shard corresponding to the user is permitted according to the company policy or the legal requirement in the first geographic region.

18. The computing device of claim 14 wherein the memory includes additional instructions executable by the processor to cause the computing device to:
 in response to determining that automatic replication of the file to the user shard in the second geographic region is permitted,
 transmit the file to another network storage in the second geographic region; and
 store the transmitted file in the user shard at the another network storage in the second geographic region.

19. The computing device of claim 14 wherein the file reference includes a file identification string, a file identification number, or a Universal Resource Locator of the file stored in the tenant shard in the first geographic location.

20. The computing device of claim 14 wherein the memory includes additional instructions executable by the processor to cause the computing device to attach metadata to the file stored at the tenant shard in the first geographic region to indicate that the file reference to the stored file has been created in the user shard in the second geographic region subsequent creating the file reference in the user shard.

* * * * *